United States Patent Office

3,809,765
Patented May 7, 1974

3,809,765
METHOD FOR THE PRODUCTION OF FOOD-STUFFS IN THE FORM OF POWDERS
Arthur O. T. Bratland, Untere Augartenstrasse 1–3/5/15, Vienna 2, Austria
No Drawing. Filed June 5, 1970, Ser. No. 43,933
Claims priority, application Austria, June 6, 1969, A 5,409/69
The portion of the term of the patent subsequent to Apr. 7, 1987, has been disclaimed
Int. Cl. A23c *9/00*
U.S. Cl. 426—358                              15 Claims

ABSTRACT OF THE DISCLOSURE

A powdered foodstuff is prepared by initially mixing a milk membrane substance concentrate with a milk product and a fat. The mixture is emulsified and thereafter homogenized. The water content of the homogenized emulsion is then reduced and the emulsion dried to obtain the powder. The milk product ingredient is selected from the group consisting of buttermilk, skim milk, whole milk and mixtures thereof while the fat is selected from a group consisting of cream, milk fat, vegetable fat, butter, animal fat and mixtures thereof. The drying can be carried out by freeze drying or spray drying.

---

The invention relates to a method for the production of food stuffs in form of powders.

Food stuffs in the form of powders (in pulverized form) are known for quite a long time. This refers in particular to milk powders of all kinds, food stuffs for children, powders for the preparation of pudding and the like, mixes ready for baking and so on. Even for the preparation of beverages pulverized starting substances (base substances) which are brought into water under stirring are used already for a long time. In this regard in particular the known "Ovomaltine" shall be mentioned; in the last time even instantly soluble beverage compositions on the base of cacao or a similar base are sold. All these pulverized food stuffs contain a certain percentage of milk products, whereby also a certain fat content is provided. The fat substances within the milk exist in the form of a particle suspension with a particle diameter from 1–22 microns, wherein each one of these particles is surrounded by a membrane having a thickness of about 5 millimicrons consisting of a complicated surrounding substance, the chemical structure whereof has not yet been fully clarified and which might consist of a complex of proteinphospholipoids with a high-melting triglyceride fraction. It has shown that this surrounding substance is of settling importance for a lot of different technological processes as e.g. churning of butter or separating of milk.. Even the taste of the milk respectively of the milk products obtained therefrom is to a large extent dependent on these surrounding substances. It has been shown that the milk fat is a substance which is practically without any taste. Also, for the service properties of milk products as e.g. whipped cream, the membrane substances are of dominating importance. Thus, the whippability, the whipping time, the volume of the obtained foam as well as the stability of the foam (separation of serum) of whipped cream is a direct function of the content of membrane substances. Also, for homogenizing of milk products, in particular of milk, which is intended for a long storage and consequently has to be highly homogenized, the membrane substances content is of determining importance. That is, if the milk product is homogenized to a high degree, the surface of the milk fat globules becomes relatively large. However, if the membrane substance content is low, there is insufficient substance to cover the globule surfaces. Thus, sedimentation in the milk will occur. This fact negatively effects the sale-and-service-value of the product.

It has been found that said disadvantage with milk products can be avoided if membrane substances in a suitable form are added to the milk products. In particular it is an object of the invention to provide food stuffs in powder form and having a fat content, the fat phase whereof shows with regard to its stability, storage life and reemulsibility, excellent properties and whereby moreover the taste of said food stuffs is improved to a high extent. According to the invention food stuffs in the form of powders are produced in such a way that concentrates of milk-inherent membrane substances are emulsified with milk products and fat-substances and the resulting emulsion is preferably homogenized and dried. Drying can be carried out by spray drying of the emulsion or, after thinning and/or fat-enrichment of the emulsion, by subsequent freeze-drying. The emulsion can also be thickened (concentrated) and/or separated with the resulting low-fat fraction being subjected to a spray-roller or foam-drying while the high-fat-fraction is subjected to freeze-drying and the resulting powder instantized.

Further features of the method according to the invention are that the emulsion step is effected at about 40–100° C., eventually under addition of water, that an emulsion with a fat content between 0.5 and 80 percent is prepared, that the emulsion is homogenized between 40 and 90° C. and at a pressure of 20–300 kp./cm.$^2$, that the thickening (concentration) step is continued until a water content of less than about 50 percent is obtained, that the freeze-drying is effected at about $-20°$ C. to $-30°$ C. and at about $10^{-1}$ to $10^{-3}$ torr (mm. Hg), that buttermilk, skimmed milk, whole milk or mixtures and/or powders and/or concentrates thereof are used as milk products, that cream, milk fat, vegetable fats, butter, other animal fats, and/or mixtures thereof are used as fat substances, and that water-based phases which are obtained when emulsifying milk products with fat substances, separating the emulsion into a high-fat-fraction and a low-fat-fraction, dividing the high-fat-fraction under separation of fat and liberating the separated fat of the water-based, respectively water soluble, phase, are used as membrane substance concentrates.

The fat content of the food stuffs in powdered form according to the invention thus can in every regard be adapted to the use of the particular food stuffs. For example, the melting point of the ft phase can practically continuously be chosen in a large range by selecting of suitable fat substances, which fact is in particular of importance since food stuffs in pulverized form are intended to be stored for longer time intervals and consequently have to show a corresponding stability on storage without negative affection of the properties regarding the taste and the service properties as the reemulsibility of the fat phase, in particular of beverage preparations, or for example unchanged baking performance of ready mixes for baking purposes. Another advantage of the food stuffs in powdered form according to the invention is that the fat substances used can with regard to their composition be adapted to the particular requirements regarding digestibility and compatibility within the organism, which are desired. Thus, for example the percentage of essential fatty acids in the fat phase can be selected by choosing the suitable base substances, which is of settling importance, in particular with food stuffs for children and dietary food stuffs. As membrane substance concentrates to be used with the method according to the invention, water based phases, which are obtained when emulsifying milk products with fat substances, separating the emulsion into a high-fat-fraction and a low-fat-fraction, dividing the high-fat-fraction under separation of fat and liberating the separated fat of the water based, respective water soluble, phase, will be selected.

The method according to the invention will now be more fully described under use of some examples.

EXAMPLE 1

A membrane substance concentrate with a fat content of 0.05 percent, the preparation whereof being described below, was added to a mixture of buttermilk with a fat content of 0.8 percent and whole milk powder containing 3.6 percent water and having a fat content of 27.5 percent, and said mixture consequently emulsified with butter fat having a fat content of about 96 percent, at about 40° C. within an emulsifier. Hereby an emulsion with a fat content of 40 percent was prepared, the emulsion being subsequently homogenized at 40° C. and 280 kp./cm.$^2$. Subsequently the emulsion was thickened to a water content of about 30 percent under use of a vacuum concentrator. Then, the concentrated product was subjected to a freeze-drying at —40° C. and 0.01 torr and the resulting milk powder, having a water content of less than 1 percent was removed.

The obtained powder is excellently suitable as an addition to ready mixes for baking purpose and to beverages of all kinds.

The membrane substance concentrate as used according to the invention has been prepared as follows.

Buttermilk, which contains about five times as much membrane substance as whole milk, was emulsified with butter fat at about 60° C. under use of a mixer. It is possible to use skimmed milk, whole milk, whey or mixtures respectively powders and/or concentrates of said substances instead of buttermilk; instead of the butter fat, butter, cream with a fat content of between 7 and 80 percent, other animal or vegetable fats, respectively mixtures of the above substances, can be used. The emulsifying is suitably effected between 40 and 100° C., and emulsion with a fat content of 0.5–10 percent is prepared. According to the present example, an emulsion with a fat content of 8 percent was prepared and subsequently separated into a high-fat-fraction and a low-fat-fraction under use of a separator. The low-fat-fraction showed a fat content of 0.4 percent. Said fat content can suitably be selected between 0.03 and 0.09 percent. The high-fat-fraction comprised 40 percent fat, whereby the fat content can vary in this instance between 10 and 80 percent. Subsequently, the high-fat-fraction was separated into a fat phase comprising about 90 percent free fat and into a water-based phase having a fat content of 0.03 percent under use of a "clarifixator." A "clarifixator" is a centrifugal separator, wherein by using of counter pressure the bond between the fat substance and the surrounding membrane substances can be broken, whereby the liberated membrane substances follow the low fat phase which is formed thereby. The fat phase as produced by the "clarifixator" can show a free fat content between 80 and 100 percent, the liberated water-based serum is held as free of fat as can be. The fat phase which has been obtained in the "clarifixator" was subsequently melted and subjected to centrifugal force, to be thereby liberated from the still existent water-based, respectively water soluble component. Hereby a serum being practically free of fat was obtained, while the remaining fat phase had a free fat content between 98 and 100 percent.

The low-fat-fraction having been obtained by the separating step was mixed with the low-fat-fraction obtained with the clarification and with the serum obtained at the purification of the fat phase, and was used as membrane substance concentrate. Said three fractions (sera) differ very much with regard to their membrane substance content. The serum obtained at the clarifixation contains about ten times as much, and the serum obtained at the purification of the fat phase contains about 100 times as much membrane substances as the serum obtained at the separation step. This indicates the possibility to use said sera independently of each other as concentrates.

Depending on whether a powder or a liquid (each of which may have different percentages of non-fat solids) is used as the milk product in the preparation of an emulsion from the membrane substance concentrate, it is possible, by choosing a suitable membrane concentrate, to prepare emulsions with substantially constant non-fat solids content. In such cases, it is not necessary to add further alien substances, for example, water.

EXAMPLE 2

223 liters cream with a fat content of 58 percent (the present examples use the metric system), which means 129.34 kg. fat and 11.5 kg. fat free solids, 356 liters (l.) sweet buttermilk with a fat content of 0.8, which means 2.85 kg. fat and 12 kg. buttermilk powder were mixed at 55° C. and homogenized at the same temperature and a pressure of 50 kp./cm.$^2$. Subsequently the mixture was cooled down to 4° C. and matured for 24 hours at that temperature. This maturing was among others effected for the purpose to assure an even division of the membrane substances to the particular fat globules. Then, 89 liters (l.) acid buttermilk with a fat content of 0.8 percent, which means 0.81 kg. fat and 1333 liters (l.) water were added to the mixture which subsequently was mixed again. The obtained mixture (2000 liters (l.) having a fat content of 6.645 percent, which means 132.9 kg. fat and a percentage of dry non-fat solids of 61.3 kg., since the total fat content of the added buttermilk has been 3.56 kg. and the percentage of fat free dry solids was 37.8 kg.) was immediately after mixing subjected to a spray drying at 120° C. in a drying tower. The obtained powder showed a water content of about 3.5 percent.

EXAMPLE 3

251 liters (l.) cream with a fat content of 58 percent, which means 145.48 kg. fat and 12.5 kg. fat free dry substance (solids), 333 liters (l.) sweet buttermilk with a fat content of 0.8 percent, which means 2.67 kg. fat, were mixed with 12 kg. buttermilk powder at 55° C. and subjected to homogenization at the same temperature and under a pressure of 50 kp./cm.$^2$. Subsequently the mixture was cooled down to 4° C. and matured for 24 hours at that temperature. Then, 83 liters (l.) acid buttermilk with a fat content of 0.8 percent, which means 0.68 kg. fat and 1333 liters (l.) water were added and the whole mixture was mixed again. The obtained mixture (2,000 liters (l.) having a fat content of 7.445 percent, which means 148.91 kg. fat and a percentage of dry non-fat solids of 59.9 kg., inasmuch as the added buttermilk had a total fat content of 3.33 kg. and a percentage of dry non-fat solids of 35.4 kg.) was immediately after mixing subjected to a spray drying at 100° C. in a respective tower, whereby again a powder with a water content of about 3.5 percent was obtained.

The invention is not restricted to the listed examples. So it is possible to effect the freeze-drying, depending on the water content, even at temperatures which are not very much less than 0° C. The respective conditions can be selected as a function of the water content of the used emulsion and also of the used vacuum. It is evident that it will be best to select the most suitable working conditions in economical regard. The water content of the obtained powder can be up to 6 percent. Moreover it is possible to increase the temperature of the atomizing drying (spray drying) as a function of the airflow and the substance flow in the apparatus. As a function of the most suitable working conditions also the concentration will be ended at a corresponding water content. Inasmuch as a freeze-drying is only economical if the respective substances have a low water content it will be suitable to effect a rather thorough concentration.

What is claimed is:

1. A method for the production of a powdered foodstuff comprising the steps of
    obtaining a milk-inherent membrane substance concentrate formed by separating a low-fat fraction from a first emulsion of a milk product and a fat substance with said low-fat fraction constituting said concentrate and contaniing 0.03% to 0.9% fats by weight;

adding a milk product selected from the group consisting of buttermilk, skim milk, whole milk, and mixtures thereof, and a fat selected from the group consisting of cream, milk fat, vegetable fat, butter, animal fat and mixtures thereof to said concentrate to obtain a mixture thereof;

emulsifying said mixture into a second emulsion;

homogenizing said second emulsion; and subsequently drying said second emulsion to obtain a powder and removing the resultant powder.

2. A method as set forth in claim 1 wherein said emulsifying step is effected at a temperature of from 40° C. to 100° C. with an addition of water.

3. A method as set forth in claim 1 wherein the second emulsion has a fat content of from 0.5% to 80%.

4. A method as set forth in claim 1 wherein said homogenization is carried out at a temperature from 40° C. to 90° C. and a pressure of from 20 kp./cm.$^2$ to 300 kp./cm.$^2$.

5. A method as set forth in claim 1 which further comprises the step of reducing the water content of the emulsion to below 50%.

6. A method as set forth in claim 1 wherein said drying step is effected at a temperature from —20° C. to —30° C. and at a pressure of from $10^{-1}$ torr (mm. Hg) to $10^{-3}$ torr (mm. Hg).

7. A method as set forth in claim 1 wherein the membrane substance concentrate is obtained by first emulsifying a milk product with a fat substance to produce said first emulsion, separating said latter emulsion into a high-fat fraction and a low-fat fraction, dividing said high-fat fraction into a fat phase containing free fat and a water-based phase having a low-fat content, and separating said fat phase into a free fat phase containing between 98% and 100% fat and a substantially fat free serum, and thereafter mixing said low-fat fraction, said water based phase and said fat free serum together to form the membrane substance concentrate.

8. A method for the porduction of a powdered foodstuff comprising the steps of obtaining a milk-inherent membrane substance concentrate formed by separating a low-fat fraction from a first emulsion of a milk product and a fat substance, with said low-fat fraction constituting said concentrate and containing 0.03% to 0.9% fat by weight;

adding a milk product and a fat to said concentrate to obtain a mixture thereof having a predetermined water content;

emulsifying said mixture into a second emulsion;

homogenizing said second emulsion;

thickening said second emulsion to decrease the water content thereof; and subsequently freeze drying said thickened second emulsion to obtain a powder and removing the resultant powder.

9. A method as set forth in claim 8 wherein said milk product is selected from the group consisting of buttermilk, skim milk, whole milk and mixtures thereof.

10. A method as set forth in claim 8 wherein said fat is selected from the group consisting of cream, milk fat, vegetable fat, animal fat and mixtures thereof.

11. A method as set forth in claim 8 wherein said emulsifying step is carried out at a temperature of from 40° C. to 100° C.

12. A method as set forth in claim 8 wherein said second emulsion has a fat content of 0.5 to 80% fat.

13. A method as set forth in claim 12 wherein said emulsion is homogenized at a temperature of from 40° to 90° C. and at a pressure of 20 to 300 kp./cm.$^2$.

14. A method as set forth in claim 13 wherein said emulsion is thickened to a water content of less than 50%.

15. A method for the production of a powdered foodstuff comprising the steps of obtaining a milk-inherent membrane substance concentrate formed by separating a low-fat fraction from a first emulsion of a milk product and a fat substance, with said low-fat fraction constituting said concentrate and containing 0.03% to 0.9% fat by weight;

adding a milk product and a fat to said concentrate to obtain a mixture thereof;

homogenizing said mixture;

thereafter cooling said mixture;

subsequently adding buttermilk to said cooled mixture and mixing said mixture and buttermilk to form a second mixture; and spray drying said second mixture to obtain a powder and removing the resultant powder.

References Cited

UNITED STATES PATENTS

| | | | |
|---|---|---|---|
| 3,314,798 | 4/1967 | Graves | 99—123 |
| 3,477,853 | 11/1969 | Hull et al. | 99—63 |
| 2,526,302 | 10/1950 | Turgasen | 99—122 |
| 3,080,235 | 3/1963 | Hodson | 99—62 |
| 3,065,086 | 11/1962 | Leviton | 99—54 |
| 3,505,077 | 4/1970 | Bratland | 99—60 |
| 3,241,975 | 3/1966 | Brochner | 99—201 |
| 3,468,670 | 9/1969 | Nilsson | 99—201 |
| 3,321,319 | 5/1967 | Hachenberg | 99—201 |
| 3,716,378 | 2/1973 | Bratland | 99—60 |

OTHER REFERENCES

McDougall G. H.: The Buttermakers Manual, New Zealand University Press, New Zealand, vol. 2, 1953 (pp. 1055, 1059 and 1060) SF263M25.

Jenness et al.: Principles of Dairy Chemistry, John Wiley & Sons, Inc., N.Y., 1959 (p. 282) SF253J9.

Bratland, A.: The Preparation of Reconstituted Milk or Cream, Chemical Abstracts, vol. 65, December 1966, p. 19230, QD1451C2.

McDowall, F. H.: The Buttermakers Manual, New Zealand University Press, New Zealand, vol. 2, 1953 (pp. 1055, 1059 and 1060 SF263N25).

Norman, G. H.: Dried Buttermilk Improves Palatability of Reconstituted Milk, The Milk Products Journal, vol. 46, No. 1, 1955, pp. 38–39. Copy 6P-172.

Vitez, L.: Dehydration of Yogurt, Chemical Abstracts, 89858q, vol. 67, 1966.

ROBERT L. LINDSAY, Jr., Primary Examiner

W. F. SMITH, Assistant Examiner

U.S. Cl. X.R.

426—187, 189, 357, 385, 491

UNITED STATES PATENT OFFICE
CERTIFICATE OF CORRECTION

Patent No. 3,809,765          Dated May 7, 1974

Inventor(s)    Arthur Bratland

It is certified that error appears in the above-identified patent and that said Letters Patent are hereby corrected as shown below:

Column 2, line 47, "ft" should be --fat--.

Column 3, line 44, "0.09" should be --0.9--.

Column 5, line 39, "98%" should be --90%--.

Column 5, line 43, "porduction" should be --production--.

Signed and sealed this 8th day of October 1974.

(SEAL)
Attest:

McCOY M. GIBSON JR.
Attesting Officer

C. MARSHALL DANN
Commissioner of Patents